Patented Apr. 21, 1931

1,802,258

UNITED STATES PATENT OFFICE

OSCAR JAECK, OF REINACH, SWITZERLAND, ASSIGNOR TO SOCIETY OF CHEMICAL INDUSTRY IN BASLE, OF BASEL, SWITZERLAND

PROCESS FOR IMPROVING TEXTILES

No Drawing. Application filed July 19, 1928, Serial No. 294,062, and in Switzerland July 28, 1927.

This invention relates to improvements in processes for improving materials, particularly textiles, this term including also straw and leather and is based on the observation that the salts of the monoacylated diamines and the unsymmetrically di-acylated diamines and the corresponding quaternary ammonium compounds when added in small portion to an acid solution, have a remarkable wetting and penetrating effect. These products are described in the U. S. Patent Specification Nos. 1,534,525 and 1,737,458 and in the British Patent Specification No. 294582 and correspond with the general formula

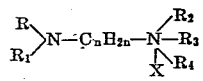

wherein R means H, acyl or a hydrocarbon radical, $R_1$ means acyl, $R_2$ and $R_3$ mean a hydrocarbon radical such as alkyl, aryl, aralkyl, $R_4$ means a hydrogen atom or a hydrocarbon radical, such as alkyl, aryl, aralkyl, X any anion, and $n$ a whole number. According to the invention these products are used with advantage in various processes for improving animal and vegetable materials.

They increase, for example, the activity of carbonizing baths, so that the content of mineral acid in a bath can be considerably diminished without lessening the efficiency.

In acid fulling, such as is practised for example in hat manufacture, or in the bleaching of straw fibre, an addition of the said products has a surprisingly favorable effect.

In dyeing with acid or mordant dyestuffs or in washing in an acid liquor, the products prove useful additions.

Hitherto it has not been known how chrome tanned skins can be dried in such a manner that by a subsequent softening operation the original properties of the freshly tanned skin can be restored. By treating the chromed skin before the drying process with a compound of the kind in question the dried skin may have imparted to it the valuable properties of the freshly tanned skin by merely fulling it with warm water. Thus among other things it becomes possible to use the dried tanned skin for all those purposes for which hitherto only freshly tanned skins have been supposed to be applicable.

The following examples illustrate the invention:—

Example 1

Woolen piece goods, for which experience has shown that in order to carbonize them completely it is necessary to use sulfuric acid of 5° Bé., are impregnated with an acid of 3.5 to 4° Bé. to which 0.2—1.5 cc. per litre of a solution of the hydrochloride of mono-oleyl-diethylethylenediamine of the formula

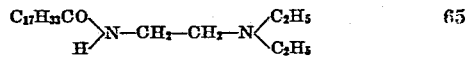

of 10 per cent. strength has been added and are then centrifuged and carbonized.

In this manner the goods, when the same machinery is used, are as completely carbonized throughout as when an acid of 5° Bé. is used with the advantage that the danger of production of carbonizing spots is much diminished, for it is known that such spots are the more likely to be produced the more concentrated the carbonizing acid.

Since the hydrochloride of mono-oleyl-diethylethylenediamine does not form a precipitate with aluminium chloride it is suitable also for use in carbonizing with the latter carbonizing agent.

Example 2

The hoods (wool or fur felt) are milled in a liquor containing sulfruic acid to which a solution of hydrochloride of mono-oleyl-diethylethylenediamine of 10 per cent. strength has been added in the proportion of 0.5 to 1.5 cc. per litre. The hat bodies thus obtained are characterized by a much softer handle and by yielding very level shades when dyed.

Example 3

Straw plait is immersed in a liquor in the proportion of 1 part to 7 parts of the liquor for 7 hours at 60° C., the liquor containing 1 to 2 cc. per litre of a solution of acetate or hydrochloride of mono-oleyl-diethylethylenediamine of 10 per cent. strength, then drained and centrifuged. When the straw plait is thus treated with the normal bleach liquor a thorough bleach with a fine permanent white is obtained.

*Example 4*

Skins are tanned in the usual manner with chromium. Then neutralized and treated with a solution containing per litre 1 to 1½ cc. of a solution of acetate or hydrochloride of mono-oleyl-diethylethylenediamine for 30 minutes in a cask at 50–60° C. The leather is then drained, struck out and dried in the usual drying apparatus.

If the leather is to be wetted out again later, it is simply worked in water at 40–50° C.

What I claim is:—

1. A process for improving textiles, this term including also straw and leather, by treating the textiles with salts of the mono-oleyl-diethylethylenediamine.

2. A process for improving textiles, this term including also straw and leather, by treating these textiles with the products of the general formula

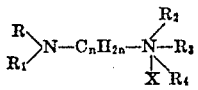

wherein R means H, acyl or a hydrocarbon radical, $R_1$ means acyl, $R_2$ and $R_3$ means a hydrocarbon radical, $R_4$ means a hydrogen atom or a hydrocarbon radical, X any anion, and $n$ a whole number.

3. A process for improving textiles of animal origin, by treating the textiles with salts of the mono-oleyl-diethylethylenediamine.

4. A process for improving textile material of animal origin, by treating the materials with the products of the general formula

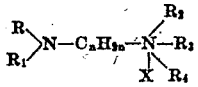

wherein R means H, acyl or a hydrocarbon radical, $R_1$ means acyl, $R_2$ and $R_3$ means a hydrocarbon radical, $R_4$ means a hydrogen atom or a hydrocarbon radical, X any anion, and $n$ a whole number.

5. A process for improving wool, by treating this material with the products of the general formula

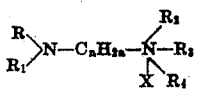

wherein R means H, acyl or a hydrocarbon radical, $R_1$ means acyl, $R_2$ and $R_3$ mean a hydrocarbon radical, $R_4$ means a hydrogen atom or a hydrocarbon radical, X any anion, and $n$ a whole number.

6. A process for improving wool, by treating this material with salts of the mono-oleyl-diethylethylenediamine.

7. A process for carbonizing wool, wherein the carbonizing bath contains products of the general formula

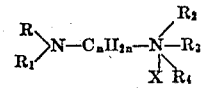

wherein R means H, acyl or a hydrocarbon radical, $R_1$ means acyl, $R_2$ and $R_3$ mean a hydrocarbon radical, $R_4$ means a hydrogen atom or a hydrocarbon radical, X any anion, and $n$ a whole number.

8. A process for carbonizing wool, wherein the carbonizing bath contains a salt of the mono-oleyl-diethylethylenediamine.

9. Textiles improved as claimed in claim 2.
10. Textiles improved as claimed in claim 4.
11. Wool improved as claimed in claim 5.
12. Wool improved as claimed in claim 7.
13. Textiles improved as claimed in claim 1.
14. Textiles improved as claimed in claim 3.
15. Wool improved as claimed in claim 6.
16. Wool improved as claimed in claim 8.

In witness whereof I have hereunto signed my name this 9th day of July, 1928.

OSCAR JAECK.